Nov. 9, 1954 B. ROBERTS 2,694,110

EQUIPMENT FOR USE WITH MAGNETIC TAPE RECORDS

Filed June 27, 1947 2 Sheets-Sheet 1

INVENTOR
Bruce Roberts
BY
Synnestvedt & Lechner
ATTORNEYS

INVENTOR
Bruce Roberts
BY
Synnestvedt & Lechner
ATTORNEYS

United States Patent Office 2,694,110

Patented Nov. 9, 1954

2,694,110

EQUIPMENT FOR USE WITH MAGNETIC TAPE RECORDS

Bruce Roberts, Philadelphia, Pa., assignor to The International Electronics Company, Philadelphia, Pa., a corporation of Pennsylvania Application June 27, 1947, Serial No. 757,573

11 Claims. (Cl. 179—100.2)

This invention relates to equipment for use with magnetic records, especially such records in tape form comprising, for example, a strip of paper carrying a coating having magnetizable particles dispersed therein.

One of the primary objects of the invention is to provide equipment of the character mentioned which is of exceptional simplicity from the standpoint of both structure and operation.

Another important object of the invention is the provision of a machine or equipment for handling magnetic tape records, which machine, in effect, constitutes an adapter unit which may readily be associated with the standard type of phonograph turntable, to receive power therefrom for the purpose of feeding the tape record from one reel to another.

The invention also contemplates a machine incorporating a pair of tape reels between which a magnetic tape record is adapted to be reversibly translated, together with improved and simplified mechanism for effecting reversal of reel drive. According to the invention the reversing mechanism incorporates electromagnetic means and control means therefor adapted to be operated by a record.

Still another feature of the invention is the provision of a novel form of braking mechanism automatically operative to restrain rotation of that reel of the pair from which the tape is being fed, this being of importance in order to avoid overrunning of said reel, with consequent loosening or tangling of the tape.

In accordance with another aspect of the invention, it is contemplated that the equipment be arranged to handle a tape record of relatively great width, for instance upwards of one inch in width, and at the same time to provide a magnetic scanning device which is shiftable in position transversely of the tape so as to provide for scanning of a multiplicity of side-by-side tracks on a given tape record.

The invention further contemplates the provision of automatic means of novel character for effecting shift of the scanning device concurrently with reversal of direction of travel of the tape between the pair of tape reels.

A novel form of control system is also provided according to the invention, which control system coordinates various of the operations and control functions referred to above, as will further appear.

How the foregoing and other objects and advantages are attained will appear more fully from the following description referring to the accompanying drawings, in which—

Figure 1:
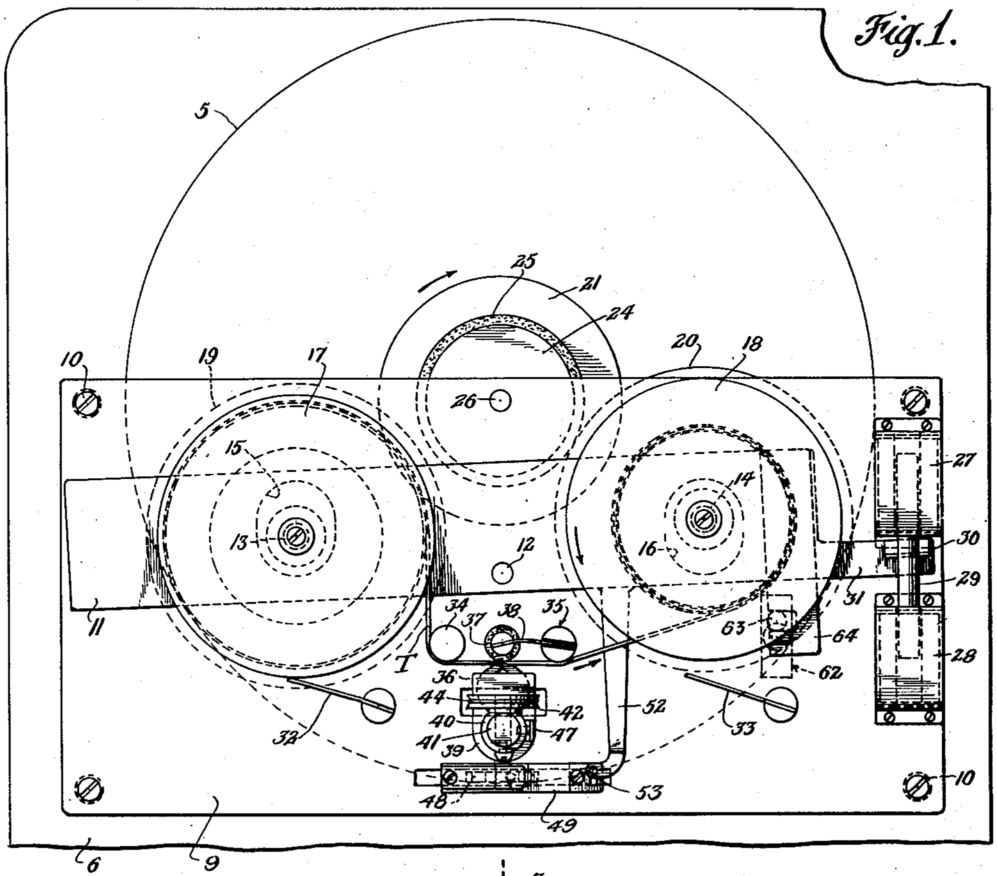
Figure 1 is a top plan view of a machine constructed according to the present invention, the view illustrating the machine as applied to a phonograph turntable of standard type.
Figure 2:
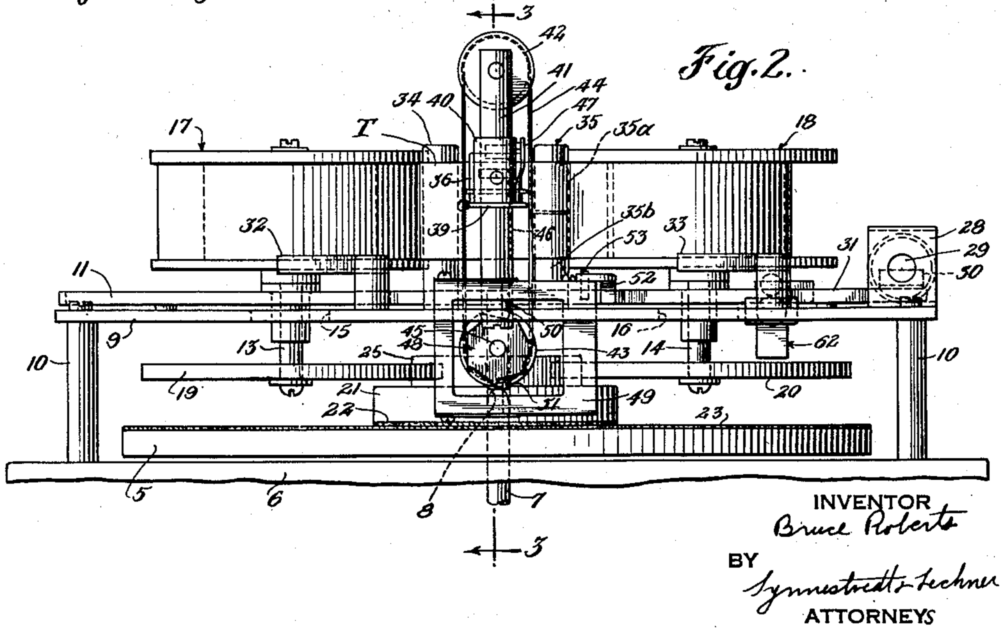
Figure 2 is a front elevational view of the machine shown in Figure 1, this view also showing the phonograph turntable with which the machine is associated.
Figure 3:
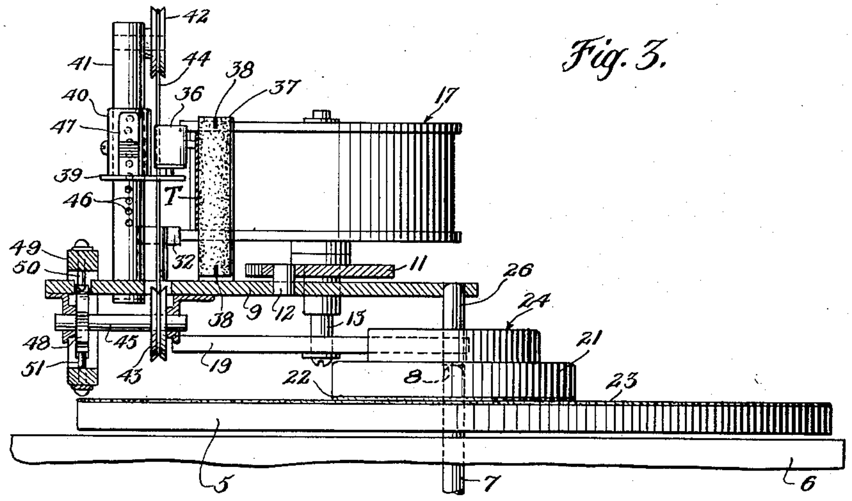
Figure 3 is a transverse vertical sectional view taken substantially as indicated by the section line 3—3 on Figure 2.

Referring first to Figures 1 to 3 inclusive, a phonograph turntable is indicated at 5, this turntable being mounted above the base plate 6 of the phonograph by means of the shaft 7 which terminates at its upper end in the usual spindle 8 which, in normal phonograph operation engages in the central aperture in the standard disc type record. It will be understood that the turntable 5 is adapted to be driven, either through the shaft 7 or in any other suitable well known manner and that the phonograph would of course be equipped with the standard pick-up (not shown) by means of which standard disc recordings may be reproduced.

The machine of the invention is built upon a main supporting plate 9 having standards or feet 10 adapted to straddle the turntable 5 and rest upon the base plate 6 of the phonograph.

A walking beam or lever 11 is pivoted to the plate 9 on the vertical pivot 12 and this lever serves as a support for reel shafts 13 and 14 which are journalled therein and extended both above and below the supporting plate 9 and the lever 11. Elongated or enlarged apertures 15 and 16 are formed in the supporting plate 9 so as to permit freedom for pivotal movement of the lever 11 with the shafts 13 and 14. Shafts 13 and 14 serve to mount the reels 17 and 18 between which a tape record such as indicated at T is adapted to be fed in either direction.

The tape reels are arranged to be driven by means of discs 19 and 20 which are fixed, respectively, on shafts 13 and 14 and which are adapted to be moved into and out of engagement with a driving member described just below.

For the purpose of effecting drive of discs 19 and 20, the invention contemplates employment of a driving puck, advantageously formed as a unit separate from the remainder of the machine, this puck having a part 21 with a central aperture configured to receive the turntable spindle 8 and having at its lower surface friction material such as indicated at 22 (for example, flocking) adapted to frictionally engage the friction material 23 normally provided on the top surface of a phonograph turntable such as shown at 5. The driving puck further includes a part 24 having a rubber or similar surfacing 25 with which the driving discs 19 and 20 are adapted to engage. A spindle 26 projects upwardly from the driving puck and is adapted to be received in a complementary aperture formed in the supporting plate 9 of the machine. Spindle 26 is coaxial with the turntable spindle 8 and serves to position the supporting plate 9 and the parts carried thereby in the proper relation to the turntable and the driving puck.

From the above it will be seen that oscillation of the lever 11 about the pivot 12 will bring one or the other of the discs 19 and 20 into engagement with the driving surface 25 of the puck, to thereby effect drive of one or the other of the reels 17 and 18. This pivotal movement of the lever 11 is effected by means of a pair of solenoids 27 and 28 having a common armature 29 which is slotted to receive the upturned edge of the angle member 30, such angle member being carried by a tongue 31 projecting from one end of the lever 11. Actuation of solenoid 27 shifts the lever 11 to bring disc 20 into engagement with the driving surface 25 and to disengage disc 19 therefrom. Actuation of solenoid 28 brings disc 19 into engagement with the driving puck and disengages disc 20.

Concurrently with the operation referred to just above, oscillation of lever 20 also brings one or the other of the braking fingers 32 and 33 into operation. In the position of the parts illustrated in Figure 1 brake 32 is applied and brake 33 is released. In the opposite position of oscillation of lever 11 brake 33 is applied and brake 32 is released. These brake fingers are adapted to bear directly against the reels 17 and 18 and the coordination of the operation of the brakes is such that the brake is automatically released from reel 18 when reel 18 is being driven and brake 32 is applied to reel 17 at this time. When the lever shifts to the other position, at which time reel 17 is being driven, brake 32 is released and brake 33 is applied.

Attention is now called to the fact that the feed path between the reels 17 and 18 is defined by a pair of posts 34 and 35. Intermediate the posts 34 and 35 the tape record is adapted to be scanned by a magnetic scanning device or head 36, this head preferably being constructed to serve for both recording and reproduction.

The tape is retained in contact with the scanning device by means of backing member 37 which is preferably resilient and yieldingly mounted, for instance by spring strips 38 supported by the posts 35.

The scanning device 36 is carried on a bracket 39 which is secured to a sleeve 40 vertically slidable on the post 41. A pair of pulleys 42 and 43 carry a belt or cord 44, pulley 42 being journalled at the upper end of post 41 and pulley 43 being fixed on a shaft 45 which is rotatively mounted below the supporting plate 9. One run of the cable 44 is secured to the bracket 39 which carries the scanning device as is clearly seen in Figure 2, and it will be noted that movement of the cable 44 shifts the scanning device vertically with relation to the post 41 and thus with relation to the tape record in the machine. Stepwise movement of the scanning device is contemplated and, to ensure proper registry of the scanning device with the several tracks on the record to be scanned, the post 41 is provided with a series of vertically spaced notches or sockets 46 with which the spring pressed detent 47 is adapted to cooperate.

The cable 44 is moved to shift the head by means of a starwheel 48 fixed on pulley shaft 45. A rectangular member or yoke 49 is arranged for guided transverse movement in a slot formed in the supporting plate 9 and this yoke carries upper and lower spring pressed actuating elements 50 and 51 (see particularly Figure 3). Because of the saw-tooth shape of the starwheel 48, reciprocation of the yoke 49 in either direction causes one or the other of the elements 50 and 51 to engage a tooth of the wheel and effect rotation thereof and thus shift the vertical position of the scanning device. The rotation of the starwheel will always occur in the same direction, so that the scanning device will be shifted stepwise from the lowermost track on the record to the uppermost track to be scanned thereon. For the purpose of resetting the mechanism, the scanning device may be manually shifted downwardly, the cable 44, at this time, merely slipping upon the pulley 43.

As best seen in Figure 1, the yoke 49 is adapted to be reciprocated by means of an arm 52 which projects from the pivotal lever 11 and which has a pin-and-slot connection 53 with the yoke. Thus oscillation of the lever 11 in either direction will effect reciprocation of the yoke 49 in one direction or the other.

It is contemplated according to the invention that a tape record be fed from one reel (for instance from reel 17) to the other (18), and that toward the end of feed of the tape in this direction the mechanism be automatically tripped to reverse the direction of feed of the tape and concurrently shift the scanning device to the next adjacent track, whereupon the record is scanned in the reverse direction in the second track. This successive reversal and shifting of the scanning device continues until all of the tracks are scanned.

Figure 4:
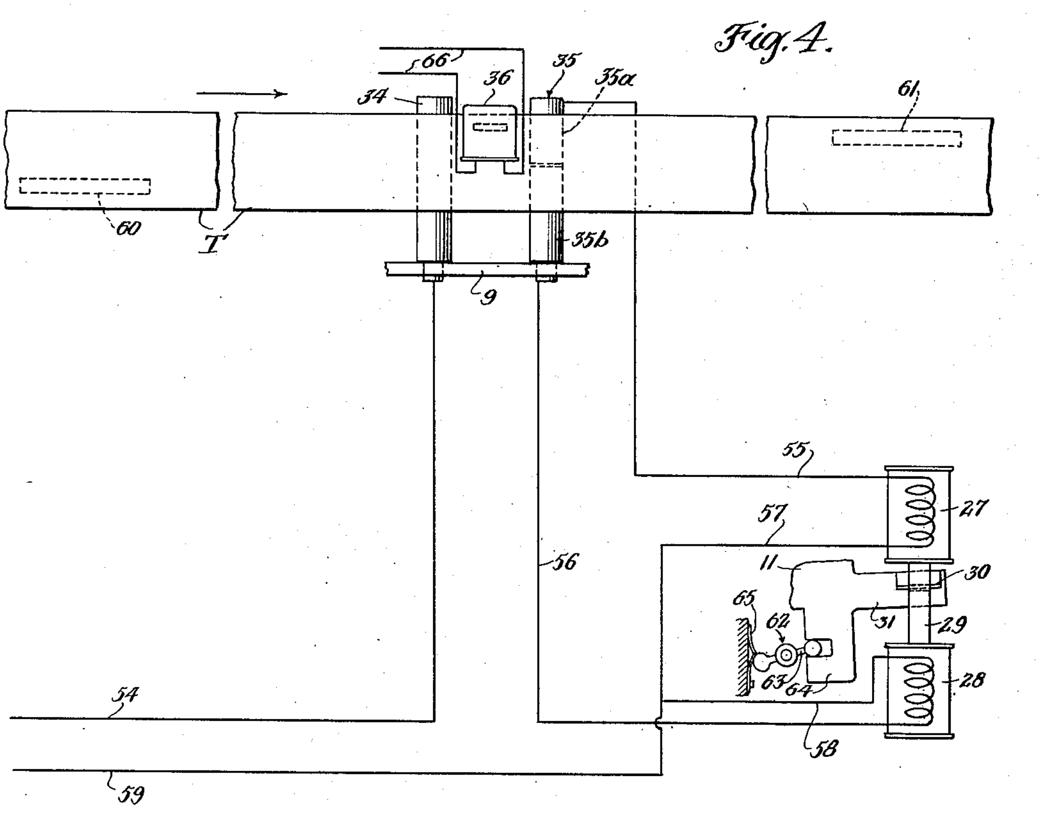
Figure 4 is a diagrammatic view illustrating certain parts of the machine and also illustrating a control system therefor.

The control system for effecting the functioning described above is best illustrated in the diagram of Figure 4. As there shown, the wire 54 of a power supply line is extended for connection with post 34, which is desirably insulated from the plate 9 and serves as a contact element. Post 35 is preferably of two-part construction, incorporationg portions **35*a* and 35*b* constituting additional contact elements which are insulated from each other and also from the supporting plate 9. The contact 35*a* is connected by means of wire 55 with one side of solenoid 27, and contact 35*b* is connected by wire 56 with one side of the solenoid 28. Wires 57 and 58 connect the other side of each of the solenoids with the other side 59 of the power supply line. With this hook-up, it will be seen that completion of the circuit between post 34 and post part 35*b* will energize solenoid 28, and that completion of the circuit between post 34 and post part 35*a* energizes solenoid 27. A contact strip 60 is carried by the tape T in position to bridge the gap between post 34 and contact 35*b*. Contact 60 is preferably located toward one end of the tape, for instance the end which is initially wound upon the reel 17. The other end of the tape carries a similar contact element 61** positioned to bridge the gap between post 34 and the contact 35*a*. Thus the two contact elements 60 and 61 are offset from each other transversely of the axis of the tape and operate to reverse the direction of feed of the tape at each end thereof.

It may here be noted that the spring strips 38 for supporting the backing member 37 are advantageously mounted in the post 35 by means of insulating bushings or the like, so as to avoid intercannection of post parts **35*a* and 35*b* through the core of the backing member 37**.

For the purpose of retaining the lever 11 in one position of adjustment or the other an over-center or toggle device 62 is employed (see Figures 1, 2 and 4), this device including a pivoted lever 63 one end of which is engaged in a slot formed in a plate or bracket 64 which projects from the lever 11. A spring 65 cooperates with the other end of lever 63 to retain the lever 63 and thus the plate 11 in either position of adjustment.

From the foregoing it will be seen that the direction of feed of the tape is automatically reversed by an exceedingly simple mechanism which concurrently provides for application of the appropriate brake (32 or 33) and also for shift of the scanning device, so as to effect scanning of the next adjacent track on the record.

It is contemplated that the circuit 66 of the scanning device may alternatively be coupled either with a source of signal current to be recorded or with an appropriate reproduction circuit, such as an amplifier, so that the same scanning device may be employed alternatively for recording and for reproduction. Tape records may therefore be recorded, for instance by feeding the scanning head with appropriate signal currents derived for example from a radio receiver, a local microphone or the like. The records may be reproduced, for instance by appropriate connection of the circuit 66 of the scanning device with the usual amplifier employed in the phonograph with which the machine is adapted to be associated. Since the electrical circuits referred to form no part of the present invention per se they need not be described in detail herein.

From the foregoing it will be seen that the invention provides an exceedingly simple machine, in the nature of an adapter unit, which may readily be associated with a standard disc record phonograph turntable to receive power therefrom, provision being made for reverse translation or feed of a tape record by driving one or the other of the tape reels.

I claim:

1. Equipment for use with magnetic tape records comprising, in combination with a pair of reels between which a tape record is adapted to be reversibly translated, a support for said reels having a mounting pivot located between the reels and providing for pivotal movement of the support in either of two directions, each reel having driving means therefor carried by the reel support for pivotal movement therewith, a reel driving element with which said driving means are alternatively engageable upon pivotal movement of said support, and trip mechanism operative toward the end of a run of a tape record from one reel to the other to shift the reel support to effect reverse translation of a record.

2. A construction according to claim 1 and further including a toggle device for retaining the reel support in one position or the other.

3. Equipment for use with multi-track magnetic tape records comprising a pair of reels between which a magnetic tape record is adapted to be reversibly translated, a rotative driving member, separate drive means for each of the reels, shiftable supporting means for said drive means adapted upon shifting movement to bring the respective reel drive means alternatively into engagement with said driving member, a magnetic scanning device positioned adjacent the path of translation of a tape record between the reels, a mounting for the scanning device providing for movement thereof with relation to a tape record, and mechanism operated by shifting movement of the supporting means for said drive means to provide for stepwise shift of the scanning device with relation to a tape record.

4. Equipment for use with magnetic tape records comprising a pair of reels between which a magnetic tape record is adapted to be reversibly translated, a magnetic scanning device positioned adjacent the path of translation of a tape record between the reels for scanning a tape record longitudinally thereof, and mechanism for shifting said scanning device transversely of a tape record to effect scanning of different longitudinally extending side-by-side tracks, said mechanism comprising a rotative actuating member and a flexible carrier element for the scanning device at least one end of which is wrapped upon the periphery of the rotative actuating member, and means for holding the scanning device in registry with different side-by-side tracks during movement of the tape from one reel to the other.

5. A construction according to claim 4 and further including a control means for reversing the direction of translation of a tape record between the reels and for concurrently rotating said actuating member to shift the scanning device.

6. Equipment for use with multi-track magnetic tape records comprising, in combination with a pair of reels arranged on spaced upright axes and between which such a tape record is adapted to be fed, a pair of upright tape guide posts establishing the tape feed path between the reels and dividing the tape feed path into three substantially straight runs one of which extends from one reel to one post, another from the other reel to the other post and the third of which extends between the pair of posts, and scanning mechanism positioned to cooperate with a tape record in the run of the feed path between the posts, the scanning mechanism being positioned in a plane between the spaced reels and comprising a magnetic scanning device and a cooperating yielding backing pad arranged opposite to each other at opposite sides of said substantially straight run of the tape feed path between said pair of posts and providing for yielding engagement of a tape therebetween, and mounting and positioning means for the magnetic scanning device providing for stepwise shifting movement of said scanning device to successively register with a multiplicity of scanning tracks on a tape record fed between the reels.

7. Equipment for use with broad tape type multiple track magnetic records comprising in combination with a pair of reels mounted to rotate on spaced axes, drive mechanism for the reels including a common driving member mounted to rotate on an axis parallel to the reel axes, a driven member for each reel, shiftable mounting mechanism for the driven members providing for alternately opposite shifting movements of the driven members toward and away from the periphery of the driving member to alternately and oppositely connect and disconnect the two reel drives and thereby alternately wind the tape record on the two reels, a magnetic scanning element engaging the record in its path between the reels, mounting mechanism for the scanning element providing for shift thereof from track to track transversely of the tape, an operating member for said last mounting mechanism shiftable in each of two opposite directions to provide for stepwise shift of the scanning element in one direction transversely of the tape, and an interconnection between said shiftable mounting mechanism for the driven members and said shiftable operating member providing for shifting movements thereof in unison, whereby said scanning element successively scans adjacent tracks in opposite directions.

8. Equipment according to claim 7 and further including trip mechanism operative toward each end of each run of the tape from reel to reel to initiate said shifting movements of the interconnected mounting mechanism and operating member.

9. Equipment for use with broad tape type magnetic records comprising, in combination with a pair of reels between which a record is adapted to be fed, a pair of rotatable supports for the reels, a magnetic scanning head positioned to engage a record in its path of feed between the reels, controllable mechanism for positively driving on reel support or the other to effect positive feed of a record alternately in opposite directions at the desired scanning speed, a guideway for the scanning head extended transversely of the feed path of a record on which the head is mounted for shifting movement to provide for engagement of the head with a record alternatively in a multiplicity of side-by-side scanning tracks, mechanism for shifting the head on the guideway from a track near one edge of a record stepwise from track to track, and means for ensuring alignment of the head with the respective scanning tracks comprising relatively movable interengageable elements one of which is movable with the head and the others of which comprise a series arranged transversely of the record feed path and spaced from each other distances equal to the spacing of the several scanning tracks.

10. Equipment for use with multi-track magnetic tape records comprising in combination with a pair of tape reels between which such a tape record is adapted to be reversibly fed, controllable drive mechanism for alternately driving said reels to feed a tape record at the desired scanning speed, a magnetic scanning head positioned to engage a tape record in its path of feed between the reels and mounted for shifting movement in the general direction of the width of the tape, mechanism for positioning the scanning head in registry with different scanning tracks comprising a device having a positioning element connected and movable with the scanning head and a device having a series of spaced recesses with which said positioning element is engageable, one of said devices being displaceable to provide for direct shift of the head in one direction across the scanning tracks, and coordinating mechanism providing for stepwise shift of said positioning element in the other direction conjointly with the alternating changes of drive of the reels.

11. Magnetic tape record handling equipment adapted for use with disc record phonograph equipment comprising a base plate and a disc record turntable with a central spindle mounted for rotation above said base plate, said magnetic tape record handling equipment comprising a frame structure having supporting feet spaced sufficiently to straddle the turntable and to rest upon said base plate to give vertical support to said frame, a pair of tape reels mounted on the frame, and mechanism for driving the tape reels comprising a driving puck for transmitting power from the turntable to the reels, said puck having an aperture to receive the spindle of the turntable to thereby position the puck with relation to the turntable, and the puck and said frame further having cooperating bearing parts arranged coaxially of the turntable-receiving aperture to position the frame horizontally with relation to the puck.

References Cited in the file of this patent

UNITED STATES PATENTS

| Number | Name | Date |
|---|---|---|
| 773,985 | Ries | Nov. 1, 1904 |
| 1,326,997 | Uebelmesser | Jan. 6, 1920 |
| 1,758,559 | Croll | May 13, 1930 |
| 1,803,403 | Owens | May 5, 1931 |
| 1,813,166 | Kahn | July 7, 1931 |
| 1,971,028 | Bothe | Aug. 21, 1934 |
| 2,029,730 | Mallina | Feb. 4, 1936 |
| 2,245,286 | Marzocchi | June 10, 1941 |
| 2,275,961 | Heller | Mar. 10, 1942 |
| 2,342,691 | Plensler | Feb. 29, 1944 |
| 2,396,563 | Fries | Mar. 12, 1946 |
| 2,408,320 | Kuhlik | Sept. 24, 1946 |
| 2,419,476 | Begun | Apr. 22, 1947 |
| 2,438,222 | Lear | Mar. 23, 1948 |
| 2,468,198 | Heller | Apr. 26, 1949 |
| 2,500,903 | Neff | Mar. 14, 1950 |
| 2,513,423 | Owens | July 4, 1950 |
| 2,526,783 | Toogood | Oct. 24, 1950 |

FOREIGN PATENTS

| Number | Country | Date |
|---|---|---|
| 278,991 | Italy | Oct. 27, 1930 |
| 39,804 | Germany | Nov. 29, 1920 |